UNITED STATES PATENT OFFICE.

GEORGE D. FUST, OF NEW ORLEANS, LOUISIANA.

ROOFING MATERIAL.

No. 900,512.  Specification of Letters Patent.  Patented Oct. 6, 1908.

Application filed December 19, 1907. Serial No. 407,233.

*To all whom it may concern:*

Be it known that I, GEORGE D. FUST, citizen of the United States, residing at New Orleans, in the parish of Orleans and State of Louisiana, have invented new and useful Improvements in Roofing Material, of which the following is a specification.

My invention has to do with roofing material; and it contemplates the provision of a roofing material comprising a composition of such nature that it may be easily and inexpensively produced without the employment of elaborate machinery or skilled labor, and one which is light in weight, pliable, and not liable to break, and is, at the same time, both waterproof and fireproof.

The composition I employ in the manufacture of my roofing material consists of the following ingredients, combined in the proportions stated, viz:

| | |
|---|---|
| Water | 10% |
| Cement | 50% |
| Asbestos fiber | 20% |
| Dry paint | 10% |
| Gum arabic | 10% |

The ingredients specified are thoroughly mingled by agitation to reduce the whole to a plastic state, and the plastic mixture is then molded or otherwise reduced to the form desired, after which the product is permitted to dry or else to be dried by artificial means.

The cement and paint incorporated in my novel material serve as binders and also preclude the passage of water through the material and adapt the same to be readily repaired when perforated or otherwise impaired. The asbestos fiber renders the material pliable so as to enable the same to fit close on a roof and lessen the liability of the material being displaced by wind, and said fiber also lends toughness and strength to the material. Because of the use of dry paint as an ingredient in the material, the manufacturer may expeditiously and easily produce material of any color desired.

In addition to rendering the material pliable and lending toughness and strength thereto, the asbestos fiber obviously contributes materially to the fireproof quality of the material. The gum arabic serves solely as a finisher—i. e., to impart to the remainder of the material a gloss finish, and from this it follows that without involving departure from the scope of my claimed invention, the gum arabic may be applied to the remainder of the material subsequent to the commingling of the ingredients and the reduction of the material to the shape desired.

It will be gathered from the foregoing that the ingredients of my novel composition are easily procurable and inexpensive, and that the use of special apparatus and the employment of skilled labor are not entailed in the production of the roofing material, and consequently said material may be manufactured and sold with profit for a small price. It will also be noted that the nature of the material is such that the material is light in weight and is adapted to be handled and secured on a roof in the same manner and with the same facility as ordinary roofing means.

The employment of the gum arabic in combination with the other ingredients and particularly the asbestos fiber, is materially advantageous inasmuch as the gum arabic frees the material of the rough appearance that would otherwise be imparted to it by the asbestos fiber, and in that way materially improves the finish and appearance of the material.

Having described my invention, what I claim and desire to secure by Letters-Patent, is:

The herein described roofing material comprising cement, asbestos fiber, paint and gum arabic, combined substantially as described.

In testimony whereof I have hereunto set my hand in presence of two subscribing witnesses.

GEORGE D. FUST.

Witnesses:
LOUIS P. BRYANT,
F. M. BARTLETT.